United States Patent [19]
Morgan et al.

[11] Patent Number: 5,544,288
[45] Date of Patent: Aug. 6, 1996

[54] OBJECT RESIZING AND REPOSITIONING FOR A NEW FONT IN A GRAPHICAL USER INTERFACE

[75] Inventors: Scott A. Morgan; Steve S. Stone; Craig A. Swearingen, all of Austin, Tex.

[73] Assignee: International Business Machines Corporation, Armonk, N.Y.

[21] Appl. No.: 259,367

[22] Filed: Jun. 14, 1994

Related U.S. Application Data

[63] Continuation of Ser. No. 48,445, Apr. 15, 1993, abandoned.

[51] Int. Cl.$^6$ ........................................................ G06F 5/06
[52] U.S. Cl. ........................................... 395/157; 395/161
[58] Field of Search ...................................... 395/155, 157, 395/161, 150

[56] References Cited

U.S. PATENT DOCUMENTS

| | | |
|---|---|---|
| 4,598,283 | 7/1986 | Tung et al. . |
| 4,692,757 | 9/1987 | Tsuhara et al. . |
| 4,785,296 | 11/1988 | Tabata et al. . |
| 5,001,697 | 3/1991 | Torres . |
| 5,119,476 | 1/1992 | Texier . |
| 5,371,844 | 12/1994 | Andrew et al. ............... 395/161 X |

OTHER PUBLICATIONS

Mastering Windows 3.1 SE (Trademark of Microsoft Corporation 1992) pp. 67,82, 115, 130, 327, 739.
Mastering Windows 3.1 (Trademark of Microsoft Corporation), 1992, Attached Sheets 1–4.
IBM Technical Disclosure Bulletin vol. 35 No. 7 Dec. 1992 Selecting of A Usable Font Size For The Host Sessions, pp. 225–286.
IBM Technical Disclosure Bulletin, vol. 27 No. 12 May 1985. Updating Attributes or Data of Parent Via Changes to the Child.
Now that I have OS/2 2.0 on my computer what do I do Next . . . By Steven Levenson, Eli E. Hertz 1992.

*Primary Examiner*—Mark K. Zimmerman
*Assistant Examiner*—Cliff N. Vo
*Attorney, Agent, or Firm*—Jeffrey S. LaBaw

[57] ABSTRACT

A graphical user interface is changed according to a new font for one object in the graphical user interface. The set of appearance parameters are adjusted for the object according to the new font and presenting the object according to the adjusted appearance parameters and the new font. A set of related objects within the interface can also be changed according to the new font, once the new font is established for the object, the set of related objects in the graphical user interface for the object is determined. Then, each respective set of appearance parameters for the set of related objects is adjusted according to its object class and the set of related objects is presented according to their respective appearance parameters and the new font.

17 Claims, 9 Drawing Sheets

Window showing:
- Title bar with Menu | Menu | Menu
- UserID: SAM
- Name: Steve Man
- Department: 621
- Phone: 877- 4070
- Buttons: OK | Cancel | Help
- Information bar
- Label: 60

FIG. 3B (PRIOR ART)

Enlarged window showing:
- UserID SAM
- Name Steve
- Departme 62
- Phone 4070
- OK ancel Help
- Information
- Labels: 66, 68, 64, 62, 69

OBJECT RESIZING AND REPOSITIONING FOR A NEW FONT IN A GRAPHICAL USER INTERFACE

This is a continuation of application Ser. No. 08/048,445 filed Apr. 15, 1993, now abandoned.

BACKGROUND OF THE INVENTION

This invention relates generally to a graphical user interface to control a computer system. More particularly, it relates to changing appropriate objects within the graphical user interface in response to a request to change a font on one of the objects.

It is well known to provide a graphical user interface to allow a user to control a computer system and to present the results of user actions on the system display. In a graphical user interface, applications and data files are generally presented within windows. Each window typically has a number of elements which are associated with the window and are presented in the display space allocated to the window. The window and each of its separate elements are generally structured and stored in memory as objects which are related logically. The elements of the window are generally child objects of the main window object.

In newer graphical user interfaces, it is possible for a user to select the font by which the information is displayed if the standard font is not pleasing to the user. Typically, after the selection of the new font, the window is refreshed to display the new font, but is not changed in any other way. If the font was a larger font, it is often clipped or unreadable due to the element within the graphical user interface being too small to display it properly. If a smaller font was selected, then the window display space is wasted. Furthermore, the GUI looks awkward and malproportioned. Further, when a font is selected for one object in the graphical user interface, the font is typically changed only for the immediate object. When that object is a child object of the main window or another parent object within the window, sibling objects of the object receiving the font will not receive the new font even when it makes sense that they should.

This invention solves the problems of prior art graphical user interfaces.

SUMMARY OF THE INVENTION

Therefore, it is an object of the invention to adjust the size and position of elements within a graphical user interface according to a new font.

It is another object of the invention to pass the new font to objects which are logically related in the graphical user interface to the object for which the new font was selected.

These and other objects, features and advantages are accomplished by changing a font for an object in the graphical user interface to a new font, adjusting a set of appearance parameters for the object according to the new font and presenting the object according to the adjusted appearance parameters and the new font. The appearance parameters of the object are adjusted according to an object class of the object. A font palette within the graphical user interface may be used to change the font, wherein the new font is grabbed and dragged from a font palette and dropped over the object.

A set of related objects within the interface can also be changed according to the new font. Once the new font is established for the object, the set of related objects in the graphical user interface for the object is determined. Then, each respective set of appearance parameters for the set of related objects is adjusted according to its object class and the set of related objects is presented according to their respective appearance parameters and the new font. The set of related objects can be determined by determining a set of child objects of a parent object for the object, the set of child objects being the set of related objects.

BRIEF DESCRIPTION OF THE DRAWING

These objects, features and advantages will be more clearly understood with reference to the attached drawings and following description.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although the specific choice of computer is limited only by disk and disk storage requirements, computers in the IBM PS/2® series of computers could be used in the present invention. For additional information on IBM's PS/2 series of computers, the reader is referred to *Technical Reference Manual Personal Systems/2* Model 50, 60 Systems IBM Corporation, Part No. 68X2224 Order Number S68X-2224 and *Technical Reference Manual Personal System/2 (Model 80) IBM Corporation* Part No. 68X 2256 Order Number S68X-2254. One operating system which an IBM PS/2 personal computer may run is IBM's OS/2 2.0® for more information on the IBM OS/2 2.0 Operating System the reader is referred to *OS/2 2.0 Technical Library, Programming Guide Vol.* 1, 2, 3 *Version* 2.00 Order Nos. 10G6261, 10G6495, 10G6494.

In the alternative, the computer system might be in the IBM RISC System/6000® line of computers which run on the AIX® operating system. The various models of the RISC System/6000 is described in many publications of the IBM Corporation for example, *RISC System/6000, 7073 and 7016 POWERstation and POWERserver Hardware Technical* reference, Order No. SA23-2644-00. The AIX operating system is described in *General Concepts and Procedure-AIX Version 3 for RISC System/6000* Order No. SC23-2202-00 as well as other publications of the IBM Corporation.

Figure 1:
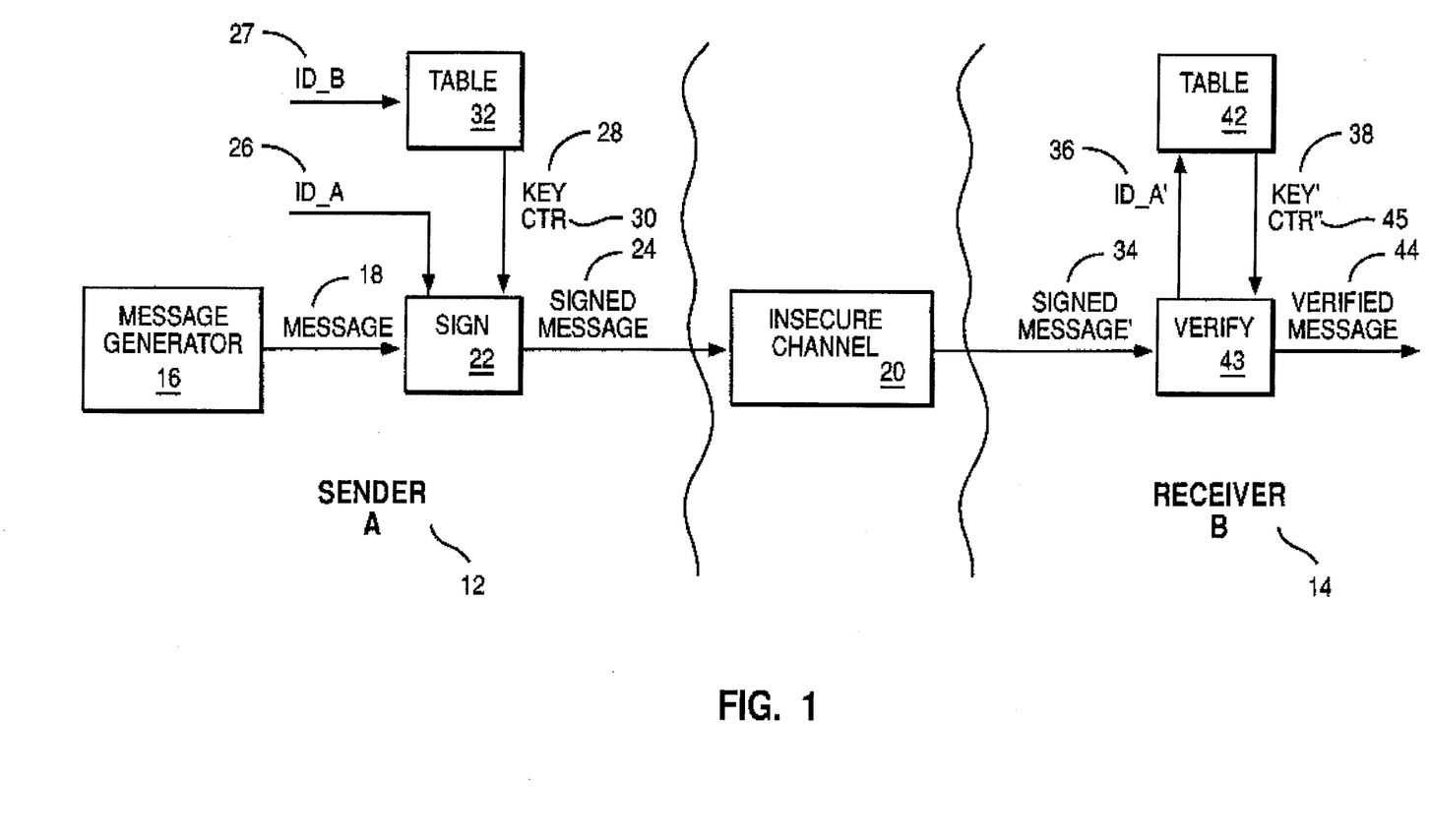
FIG. 1 shows a computer comprising system unit, keyboard, mouse and display.

In FIG. 1, a computer 10, comprising a system unit 11, a keyboard 12, a mouse 13 and a display 14 are depicted. The screen 16 of display device 14 is used to present the visual changes to the data object. The graphical user interface supported by the operating system allows the user to use a point and shoot method of input by moving the pointer to an icon representing a data object at a particular location on the screen 16 and press one of the mouse buttons to perform a user command or selection.

Figure 2:
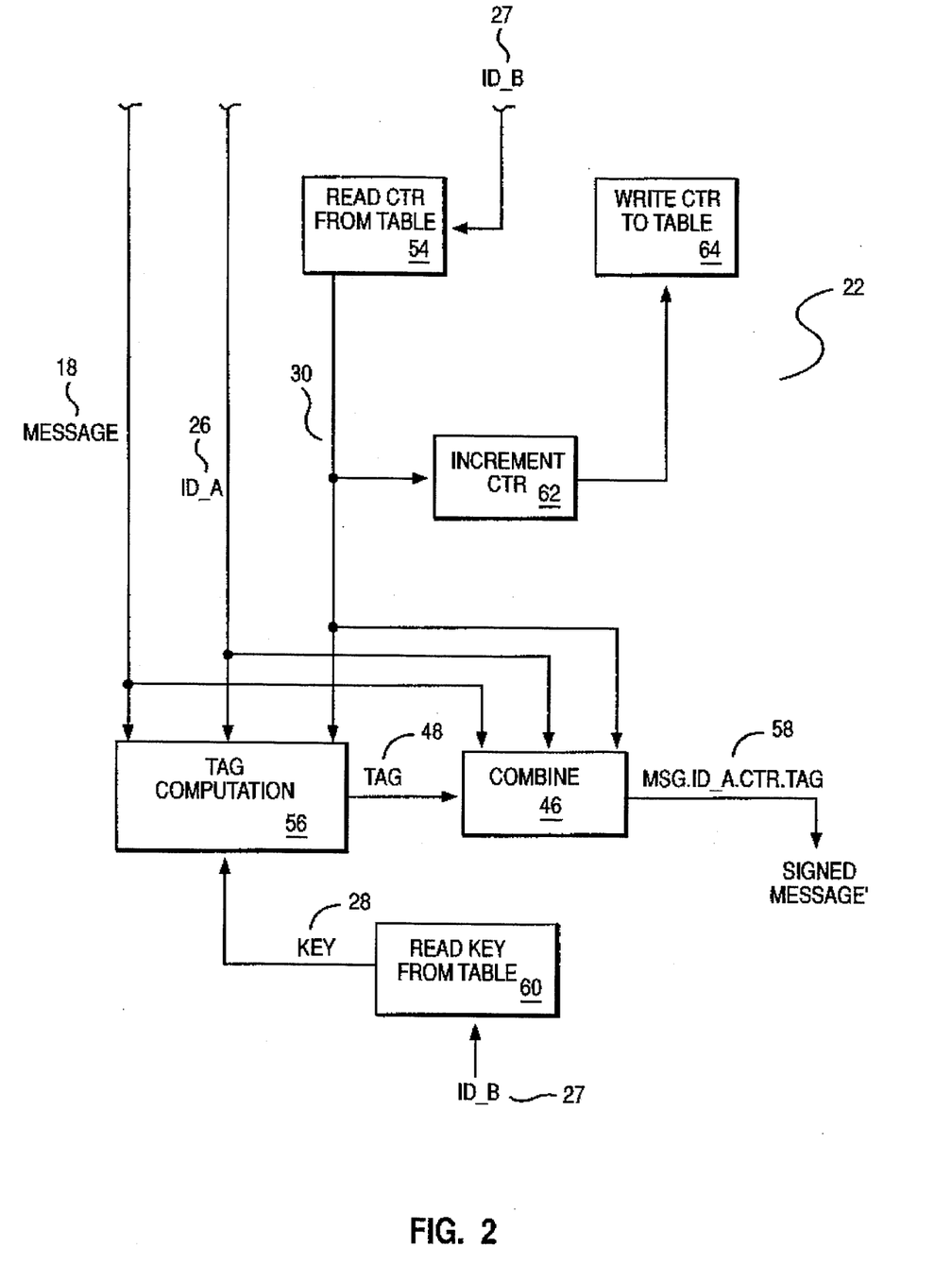
FIG. 2 is a block diagram of the components of the computer shown in FIG 1.

FIG. 2 shows a block diagram of the components of the personal computer shown in FIG. 1. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM multimedia PS/2 series of computers is one of the Intel family of microprocessors including the 386 or 486 microprocessors. However, other microprocessors included, but not limited to, Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15a and 15b. Also coupled to the system bus 21 is digital signal processor 33 which corrects the sound produced by the speaker system and is preferably incorporated into the audio controller 31. The speakers 15a and 15b may be used to present audio objects to the user. An I/O controller 40 such as a Token Ring Adapter enables communication over a network 46 to other similarly configured data processing systems.

One of the preferred implementations of the present invention is as a set of instructions in a code module resident in the random access memory. Until required by the computer system, a set of instructions may be stored on a computer readable medium, for example, the hard disk in hard disk drive 26, optical disk in the CD ROM 32 or a floppy disk in the floppy disk drive 27. As shown in the figure, the operating system 50 and presentation manager 52 are resident in RAM 24. In this example, the invention is embodied in a font handler 54 which is an adjunct onto the operating system or presentation manager. Some operating systems such as OS/2 have an embedded presentation manager. Other systems use a presentation manager which is a stand alone piece of code. If the present invention is implemented in a stand alone application which has its own graphical user interface, a similar code module would have to be developed for that particular application.

Figure 3A:
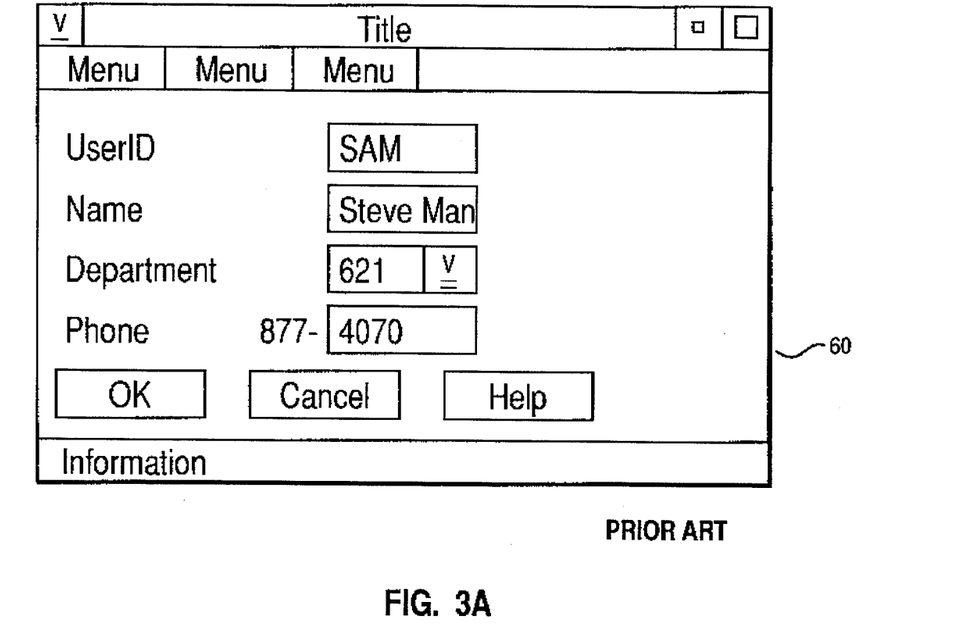
FIGS. 3A and 3B depict a prior art graphical user interface in which the controls of a window are not resized in response to the selection of a larger font.
Figure 3B:
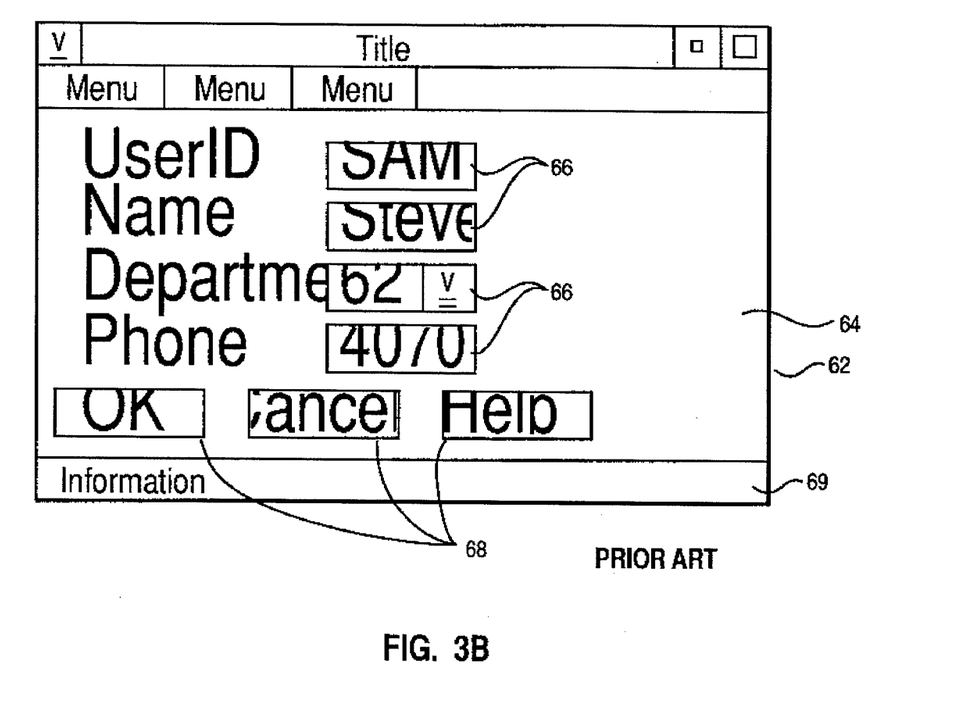

The problems of the prior art graphical user interfaces are illustrated in FIGS. 3A and 3B. An initial window 60 is shown before any font changes have taken place. As shown, the font and subobjects within the window are appropriately sized and positioned and the graphical user interface has a pleasing appearance. Nonetheless, the user has decided that he desires a larger font. In FIG. 3B, the window 62 is shown after a larger font has been dropped on client area 64. As shown, the font is too large for entry fields 66 and buttons 68. The text information in these controls is clipped and information is lost. Further, the appearance of the graphical user interface is not pleasing and does not impart the needed information to the user. Notice that the font is limited to the client area and its children and is not extended to other text containing objects such as the information line 69.

The example shown in FIGS. 3A and 3B assumes the font was dropped on the client area rather than on a particular control. Dropping on the client, all of the client's children will also inherit the new font. If dropped on a control, only that control would get the new font, plus, of course, any children of the control. In standard operation of OS/2, fonts are a presentation parameter. Presentation parameters are inherited by children unless the child has had its presentation parameter already explicitly set.

Figure 4A:
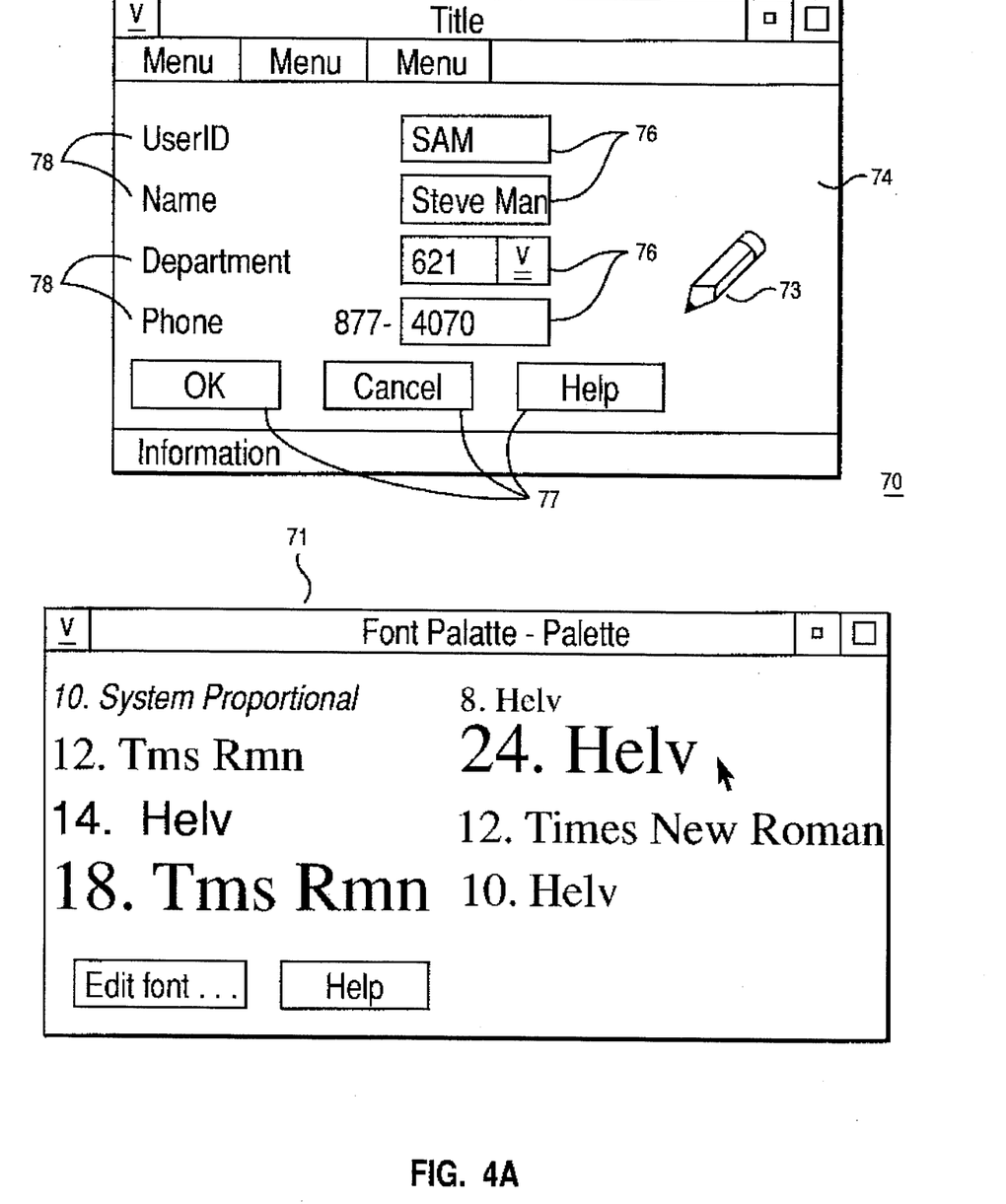
FIGS. 4A and 4B show the graphical user interface of the invention in which the appropriate objects within an interface are resized and repositioned according to the selection of a larger font.
Figure 4B:
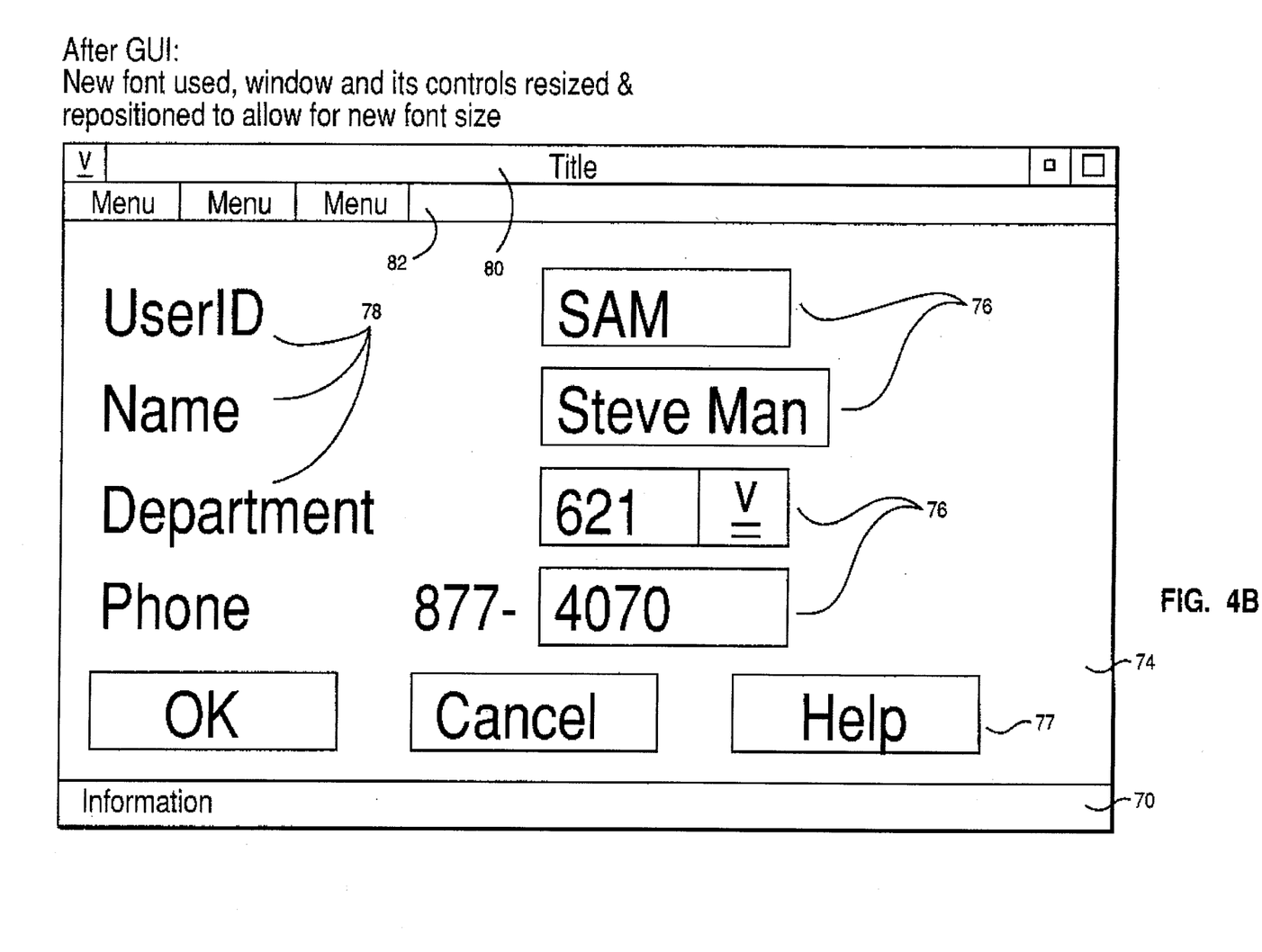

The graphical user interface of the present invention is depicted in FIGS. 4A and 4B. The window 70 in the graphical user interface depicted in FIG. 4A is similar to that in FIG. 3A. A new font is being dragged from the font palette 71 and is about to be dropped on the window 70 by pointer 73. The pointer 73 resembles a pencil indicating that a new font is being dropped. In FIG. 4B, the new font which is larger than the prior font, has been dropped on the client area 74 of the window 70. The window 70 and the client area 74, the entry fields 76 and buttons 77 have all been resized to accommodate the larger font. Further, the entry fields 76 and text 78 have been repositioned within the larger client area 74.

In the invention, the font is flowed to all related areas regardless of whether they are PM children or not. As an example, the frame lines are not children of the client area, but they get the new font because the programmer feels they are inherently related to the client area. A font dropped anywhere within the client area of a window with font support of the invention, whether on the client area or on any control within the client, will flow the font to all controls in the client and the client itself. And, or course, the font processing will cause the client and all the controls to resize and reposition to best display the new font.

The information line is just another text-based adjunct to the window. The user sees it as part of the whole. Its text changes as the user moves the cursor around the client area from one control to another. Though in the PM parent-child hierarchy it is not a child of the client, the programmer considers it to be related to the client and treat it as such by changing its font to match that of the client.

Note, however, that the text within the title bar 80 and action bar 82 have not been resized as these objects are not logically related to those within the client area 74.

The only changes made to the title bar and action bar as a result of a font change to the client is to change their width due to a change in the width of the frame window. This size change is not a result of the font change, but rather solely as a result of the frame size changing. The same thing happens when the user resizes the frame with the mouse.

The OS/2 Font Palette 71 is a tool which is part of the OS/2 2.0 operating system that is installed in the System Setup folder. The System Setup folder is found in the OS/2 System folder which is an object on the Workplace Shell desktop. This tool is used to change the font an object is using. The tool shows a series of system declared fonts from which to choose. If the font the user is looking for is not found within this series, the user can press the Edit push button which displays a dialog requesting information about the font in which the user is interested.

Once the desired font is available, the user can, using the drag mouse button, drag a font and drop it on the object that should use that font. When this occurs, the Font Palette determines what object the mouse is over and retrieves its Presentation Manager window handle. With this window handle, the Presentation Manager WinSetPresParam API is used with the P_PFONTNAMESIZE option specifying the font string associated with the one designed. The font string is in the format pointsize.facename.emphasis which is what is displayed in the list provided by the Font Palette.

Not only does the Font Palette support editing the font shown but it also allows you to add additional fonts to the system through this manner. The Edit font dialog provides an option for adding a font to the list of known system fonts. This request prompts another dialog which requests the file name wile re the font definitions exist.

While the Font Palette is the means used in the OS/2 2.0 Workplace Shell for the user to select a new font and indicate the window to which that font should apply, its use is not required to enable the font changes described in this application. Those skilled in the art could conceive of several ways of commanding the operating system to change a font in its GUI. In OS/2, the PM notification of the new font presentation parameter is done by the WM_PRESPARAMCHANGED message, caused by the issuance of the WinSetPresParam PM API.

Figure 5:
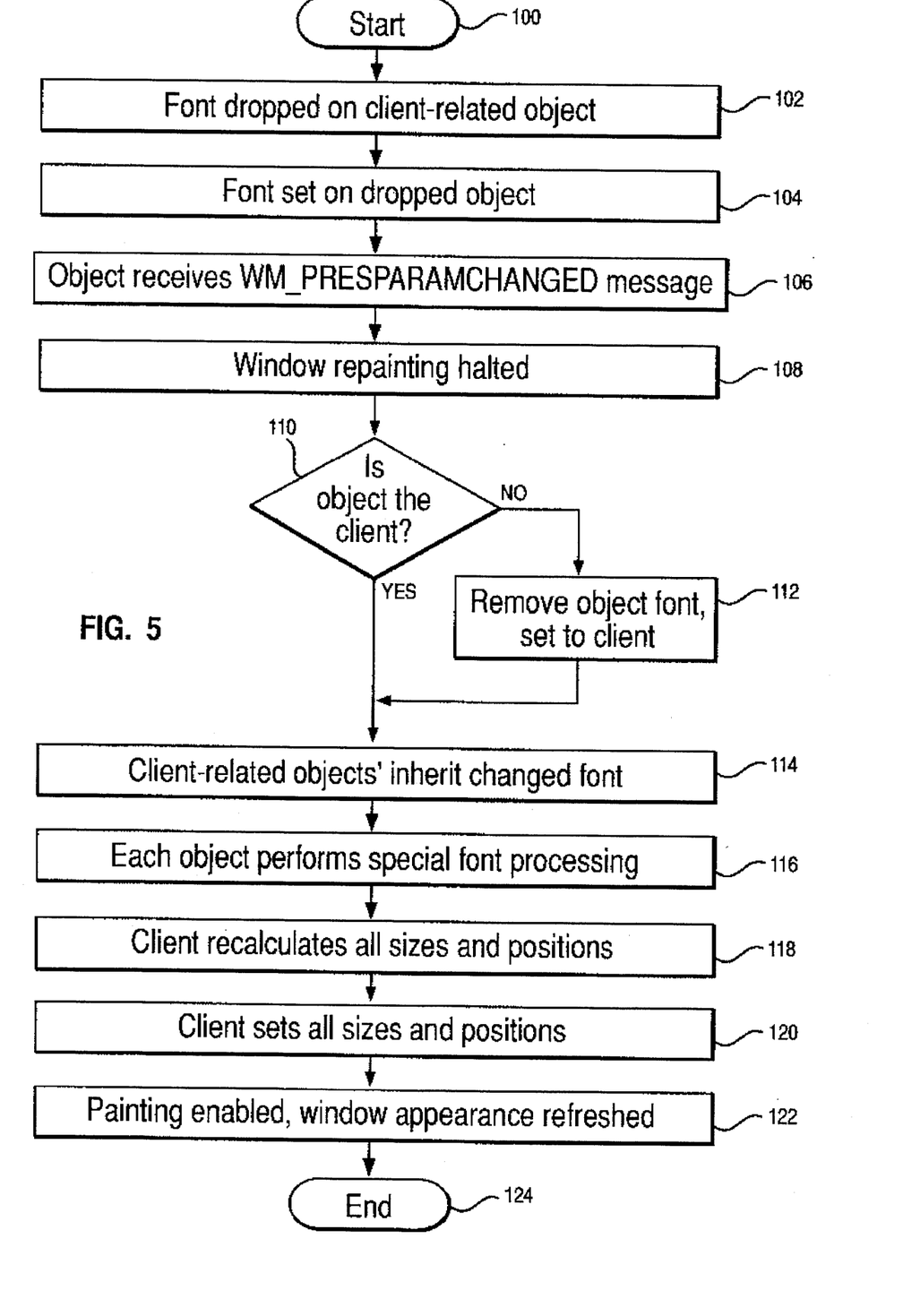
FIG. 5 is a flow diagram of dropping a new font on a window and adjusting that portion of the interface.

The process by which a window is adjusted according to a new font is depicted in the flow diagram of FIG. 5. The process begins as the font is being dragged from the font palette and dropped on the window, steps 100 and 102. When this occurs, the operating system determines what object the font was dropped on and sets the font of the object to the new font in step 104. Next, the object on which the font was dropped receives a WM_PRESPARAMCHANGED message notifying it that its font has changed, step 106. This message is the OS/2 message, other operating systems and applications would have other syntax to notify the object that its font had changed. At this point in the process, the window repainting is halted in step 108. Painting is halted so that the user does not see each control change its font, resize and position itself as required, one after the other. This would make the window flash and look confused until all the controls had finished their processing and all was sorted back out in the final arrangement. Painting is enabled again once all of these calculations and changes are finished, then refresh the display so that the user sees only one repaint into the final, new font appearance.

In step 110, a test is performed to determine whether the object is the parent object within in a tree of related objects. One example, is the client area which is the parent object of all the controls and text fields which appear within the client area. If the object is not such a parent object, the object in step 112 removes the font from itself so it can inherit the font changes from the parent object and sets the parent object to the new font.

If the object is the parent object of the particular group of related objects, in step 114, all the child objects, e.g., controls, inherit the new font and are notified by the operating system that their font has changed. Each control performs any special processing which it requires to perform a font change, step 116. The parent object recalculates its own size and position and all of the control size and position within the main window based on the new font characteristics, step 118. In step 120, the client area sets all sizes and positions as calculated. Finally, in step 122, window repainting is reenabled and the window is refreshed to show the new sizes, position and font. The process ends in step 124.

Figure 6:
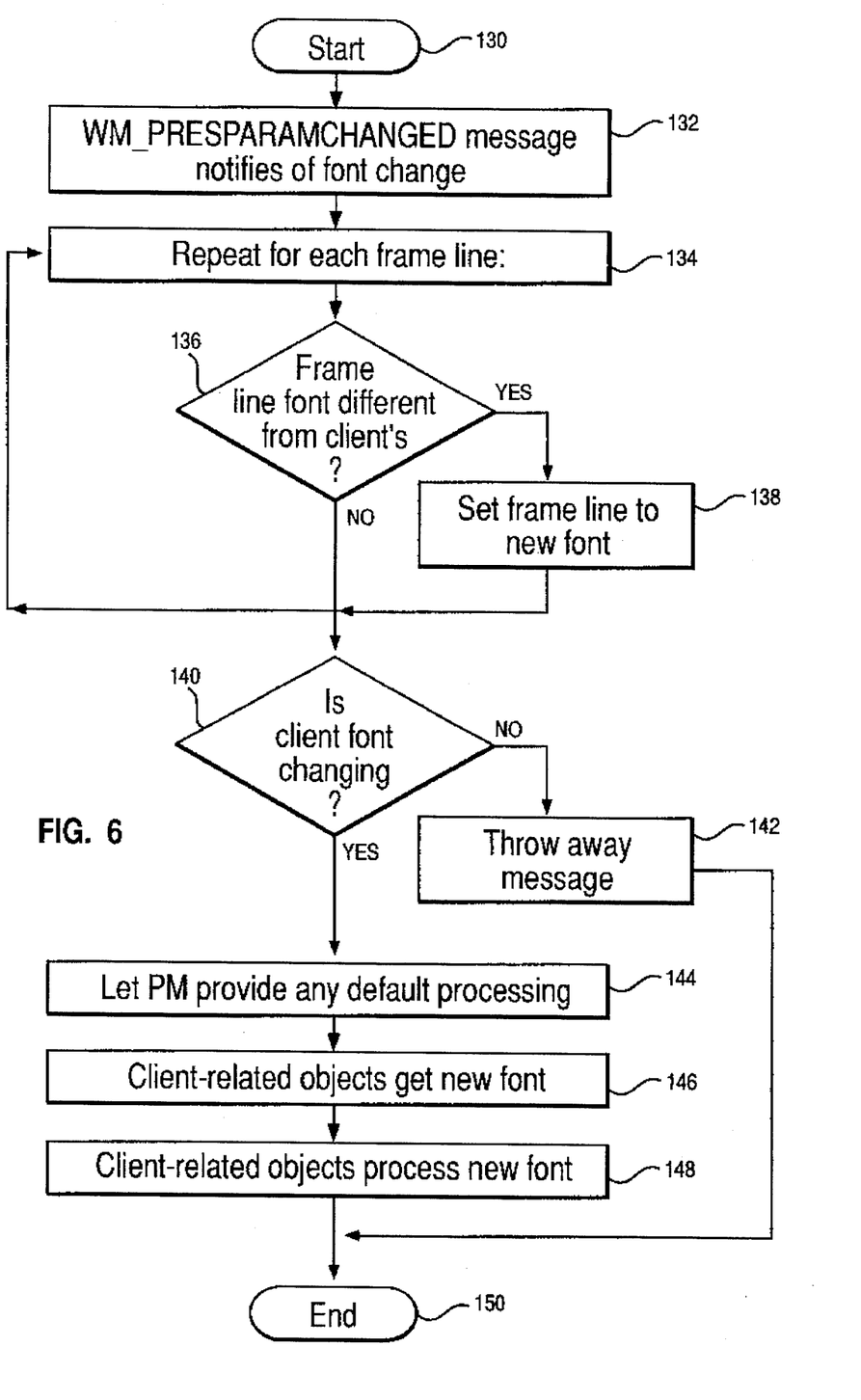
FIG. 6 is a flow diagram of adjusting other child objects within the window.

The process by which child objects of the parent object in the GUI adjust their appearance in response to the parent object being set to a new font is depicted in FIG. 6 as steps 114 and 116. The process begins in step 130 as the parent object's font is changed. In step 132, the parent object is notified with a WM_PRESPARAMCHANGED message. Step 134 begins the loop in which each of the information lines, status lines and security lines are examined. A test is performed in step 136 to determine whether the font is different from the client areas object's font. If so, the object is set to the new font in step 138. If not, a second step is performed to determine whether the new font is different from the current window font, step 140. Step 136 relates only to the information, status and security lines. Step 140 relates only to the client area itself. In step 140, the client area checks to see if the new font for the client area is the same or different from the current font for the client area. If the new font and the current window font are the same, in step 142 the message is thrown away and the processing ends. If they are different, the font change message is passed on to the child object, step 144. All controls in the body of the child object inherit the new font from +the parent object and receive the font change message in step 146. Finally, in step 148, each child object performs this specific processing for the new font and passes a font change message onto the operating system. The process ends, step 150.

As discussed above, each of the child object's processing may differ depending on the class of the object. Also, other objects in the GUI, which are not adjusted because of the new font as they contain no text or are not deemed to be related to the object on which the font was dropped, must be adjusted in size because of the objects which have changed, the related objects, due to the new font.

When a font change occurs, the affected objects should resize and adjust other aspects as needed, to reflect the new font to its best advantage. Certain classes of controls need unique adjustments for a new font size, as follows:

Entry fields should adjust their height and width to accommodate the new font.

List boxes should adjust the height of each list item, adjust the range and position of its scroll bars, and scroll the list items if needed.

Static text fields, radio buttons and check boxes should grow or shrink both vertically and horizontally so that the needed space to display the text in the new font is used.

The height of any information line, status line and/or security line should be adjusted.

The height of the scroll arrows on scrollable output fields and entry fields with scroll arrows should be adjusted to reflect the new height of the related control.

The entry field and list portions of combo boxes should adjust in the same manner as stand alone controls of those types.

Notebooks should adjust the width and height of their tabs so all of the tab text remains visible.

Containers should reflow their current view to reflect the new font.

Progress indicators should resize and respace their tick marks so that any tick text is still properly displayed.

The changes performed by each object are defined with font-based parameters. Each object knows what to do given a "general" font change because when created, the object was made size font specific. For example, an entry field is defined by how many average character widths it should contain; a list box by how many lines of max character height it should display. So, each control knows inherently what its size is based on the current font. When a "particular" font change occurs, it recalculates what its size should now be based on the new font characteristics.

Once all of the controls have resized appropriately for the new font, they should be reflowed within the window itself so that they are still properly spaced in relation to each other. Non-sizeable windows should also be resized to reflect this new flow of the controls. Sizeable windows need to adjust the size and position of their scroll bar sliders to reflect the new size of the scrollable region.

By resizing controls affected by a font change to their optimum size for that font, then reflowing them within their window to retain optimum spatial alignment, the window after the font change will retain its readability, usability and balanced appearance.

A panel's layout is described using tags in a panel definition file. In PM, a panel is defined by specifying at what exact coordinates each control is placed, and exactly how large it is in pals. In the panel definition files, the panel is defined in terms of general panel layout, such as columns and rows, expandability, control relationships, related text such as prompt, prefix and suffix, and the like. Each control's size is defined in character/font based terms as described above.

With this information, the panel is dynamically laid out at run time based on the general column/row/relationship layout, and based on the current font and the length of the current text strings in use for text controls (static text, output text, prompt text, check box and radio button text . . . ). The actual text would change in different languages, for example. Once these calculations are made, the controls are set in terms that PM can understand, i.e., located at exact coordinates and sized in pels.

When a font change occurs, the window is redisplayed based on the column/row/relationship definitions and the new font characteristics.

The dynamic creation of a graphical user interface based on new parameters given to an operating system at run time is discussed in the copending, commonly assigned application filed Aug. 19, 1991, Ser. No. 07/747,167, entitled "Computer System for Dynamically Generating Display Screen Panels Providing Interactive Interfaces for Application Program Steps", to J. W. Malcolm, which is hereby incorporated by reference.

Each font and each window have certain parameters which are used to determine the best graphical user interface for the combination of the font and the window. A Font Parameters Table and Windows Parameters Table are given below as an illustration of the types of parameters which a graphical user interface might use.

| Font Parameters Table |
| --- |
| AvCharW |
| MaxCharW |

| Font Parameters Table |
| --- |
| HUpperChar |
| HCharBox |
| TableWChar |
| Prop |

The font parameters table includes parameters for a particular font for the average character width, the maximum character width, the height of the uppercase characters, the height of the character box, a table of the width of each character in the alphabet for the font and whether the font is proportional or nonproportional. All of these parameters will determine the optimum size for the affected controls for objects within the graphical user interface.

| Window Parameters Table |
| --- |
| SzWin |
| PosWin |
| $SzCon_1$, $SzCon_2$, $SzCon_3$ . . . |
| $PosCon_1$, $PosCon_2$, $PosCon_3$ . . . |

The Window Parameter Table will have values for the size of the window, the position of the window and the graphical user interface and the size and position of each of the controls or subobjects within the window. Each of these parameters may change when a new font is dropped on an object in the window.

The actual objects which are considered "related" is a design choice by the programmer. In the examples above, when the user drops a new font on the client area of a window, it indicates a desire to change the font of those aspects of the panel which share a common factor, e.g., those that relate to data input and output. Therefore, all of the parts of the client area that relate to this should have their font changed, thus keeping similar objects acting and looking like a logical, integrated whole. Parts of the window that do not share this common factor should not be changed unless the user specifically drops a new font on them as well.

In the opinion of the programmer, the text in the information line, status line and/or security line should also inherit the new font if dropped on the client area, since their role is to output data to the user.

However, in response to the font being dropped on an object in the client area, the action bar should not inherit the new font. The action bar is primarily a traversal technique for menu display, which is different from the uses of text in the body panel. The font of the title bar should not change. The user may desire that title bars stay consistent throughout the system, as it presents a system type datum. The height of the horizontal and width of the vertical scroll bars should not change, since these sizes are not text-related.

If a new font is dropped on any object other than one of those that is considered related and for which special processing is provided, it will only get the default PM processing. For the frame, that means if it is dropped on any frame element besides the frame itself, e.g., title bar or action bar, only that object will reflect the new font. If it is dropped on the frame (sizing border) itself, the frame s children will inherit the new font as well (but will not resize and reposition themselves based on the new font). In the example architecture, the client area is not a child of the frame and dropping on the frame has no effect on the client area or its objects.

A table of OS/2 functions which are used in process described in FIGS. 5 and 6 follows below. Similar functions in other operating systems could be used. If the process were implemented in the GUI of a stand alone application, some of the functions might need to be created.

| Table of OS/2 Functions | |
|---|---|
| GpiQueryFontMetrics | 116, 118, 148 |
| GpiQueryWidthTable | 116, 118, 148 |
| WinCalcFrameRect | 118 |
| WinEnableWindowUpdate | 108, 122 |
| WinInvalidateRect | 122 |
| WinIsChild | 110 |
| WinIsWindowVisible | 108 |
| WinMapDialogPoints | 118 |
| WinQueryPresParam | 136, 140 |
| WinQueryWindow | 110 |
| WinQueryWindowPos | 116, 118, 148 |
| WinRemovePresParam | 112 |
| WinSendMsg | 116, 148 |
| WinSetPresParam | 112, 138 |
| WinSetWindowPos | 116, 120, 148 |
| WinUpdateWindow | 122 |

GpiQueryFOntMetrics:

returns the specifics about a given font
GpiQueryWidthTable:

returns a table of widths for every character for a given font
WinCalcFrameRect:

calculates what size a window frame needs to be for a given size client area
WinEnableWindowUpdate:

enables and disables window repaints and refreshes
WinInvalidateRect:

sets an area as being in need of being repainted
WinIsChild:

queries if a given window is a child of another
WinIsWindowVisible:

returns if a window allows refreshing/repainting of its appearance
WinMapDlgPoints:

translates values from pels to dialog units
WinQueryWindoW:

returns the parent or owner of a given window
WinQueryWindQWPQs:

returns the size and position of a given window
WinRemovePresParam:

removes a presentation parameter, such as a font, from a given window
WinSendMsg:

sends a message with two parameters to a given window
WinSetPresParam:

sets a presentation parameter, such as a font, for a given window
WinSetWindowPos:

sets the size and position of a given window
WinUpdateWindow:

causes a window to repaint any areas that have been marked as needing it

Figure 7:
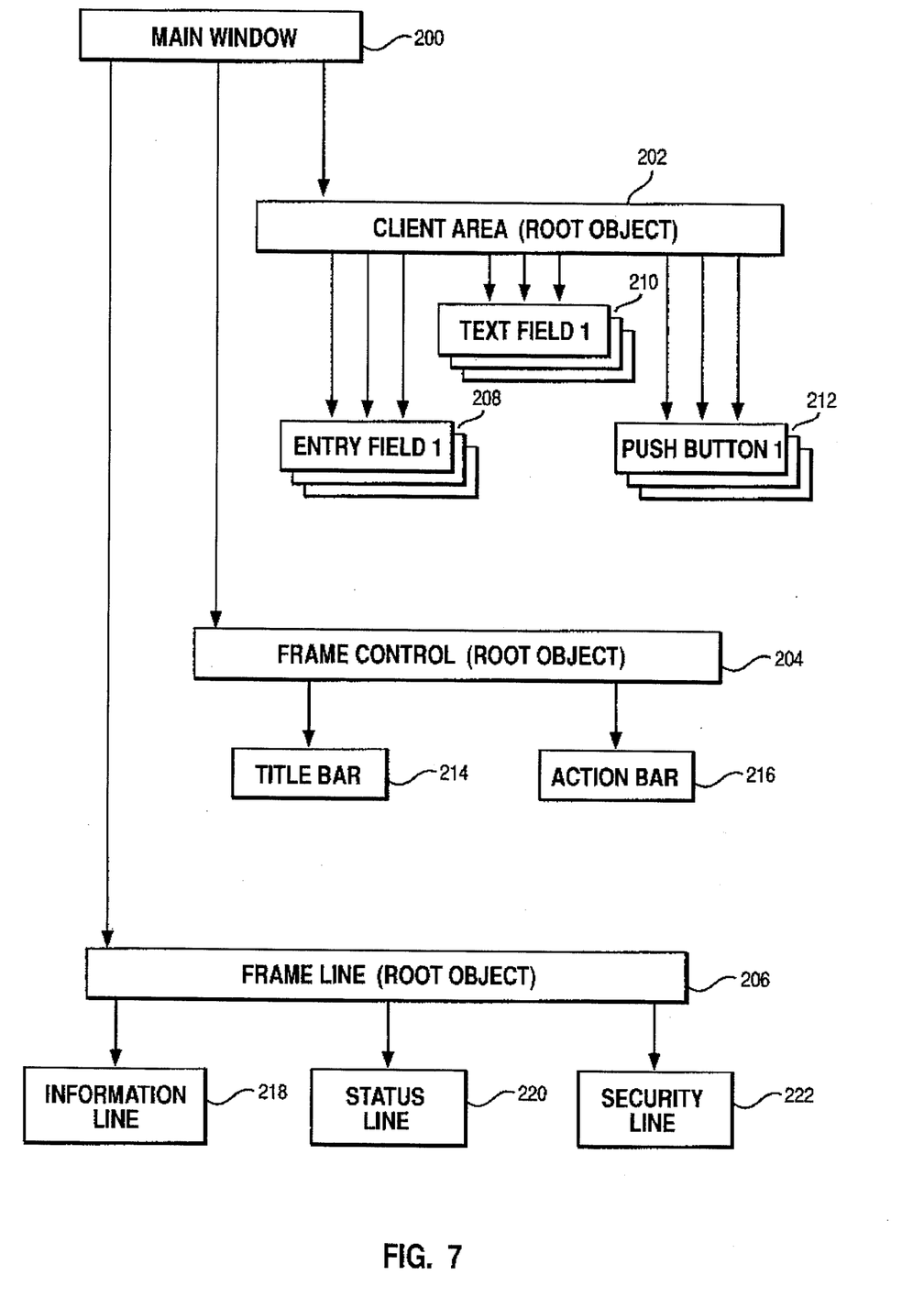
FIG. 7 is a diagram of related objects within a window.

One of the requirements of the present invention is that the related objects are known or can be determined by the system. The relationship of the objects within a generalized window is shown in FIG. 7. The main window, 200, has three child windows; the client area 202, the frame control 204 and the frame line object 206. The client area further has a plurality of child objects including entry fields 208, text fields 210 and push buttons 212. The frame control object 204 has title bar 214 and action bar 216 as child objects, and the frame line object 206 has information line 218, status line 220 and security line 222 as child objects. In an operating system, such as OS/2, this sort of information is kept by the operating system. Thus, it is relatively easy when a font is dropped on, for example, an entry field 208, to go to the client area 202 to determine all of the related child elements of the client area 202.

However, the structure provided by the operating system may not, in all cases, have the necessary structure to carry out the present invention. For example, there may be certain objects within the client area which are not considered text elements or related to other elements within the client area. A statement would have to be added to the code which implements the invention that all objects which are child objects of the client area, except for a certain class of objects, would inherit the font. Similarly, there may be no root or master object which is apparent to all of the related objects in a particular area of the window. For example, the frame line object does not exist in OS/2. Therefore, for the data structure used by the invention, these objects would have to be defined and inserted.

In a stand alone application or where too many variations on the existing data structure of objects in the operating system are required, it may be more convenient to construct a table of the related elements which will be searched when a new font is dropped on an object. For example, the table below corresponds to FIG. 7.

| TABLE |
|---|
| Main Window |
| Client Area |
| Entry Field 1 |
| Entry Field 2 |
| Entry Field 3 |
| Text Field 1 |
| Text Field 2 |
| Text Field 3 |
| Push Button 1 |
| Push Button 2 |
| Push Button 3 |
| Frame Control |
| Title Bar |
| Action Bar |
| Frame Line |
| Information Line |
| Status Line |
| Security Line |

Thus, the objects contained in the table can be varied as the programmer deems appropriate. In this case, the process refers to the table for the particular window to learn to change the fonts in all the child objects of a second order object, such as the client area, the frame control or the frame line object.

Alternatively, the table may resemble that below:

Client Area (EF1,EF2,EF3,TF1,TF2,TF3,PB1,PB2,PB3)

Entry Field 1 (Client Area, EF1,EF2,EF3,TF1.TF2,TF3, PB1, PB2, PB3)

Text Field 1 (Client Area, EF1,EF2,EF3,TF1,TF2,TF3, PB1, PB2,PB3)

Status Line (Information Line, Security Line)

In this table, the code searches for the object on which the font was dropped and finds a listing of the related objects in the parentheses following the object. In the table, EF1, for example, would represent Entry Field 1, TF2 would represent Text Field 2; and so forth. Note that in such table the "related" objects do not have to be the same set of objects which the operating system associates as child objects of a particular parent object in the graphical user interface. Instead, the programmer may decide on an intuitive basis what objects are related to a particular aesthetic characteristic. Other tables and procedures for listing and determining the related objects would occur to one skilled in the art.

The embodiment above describes run time font changes which flow the font only within the frame window on which the font was dropped.

Figure 8:
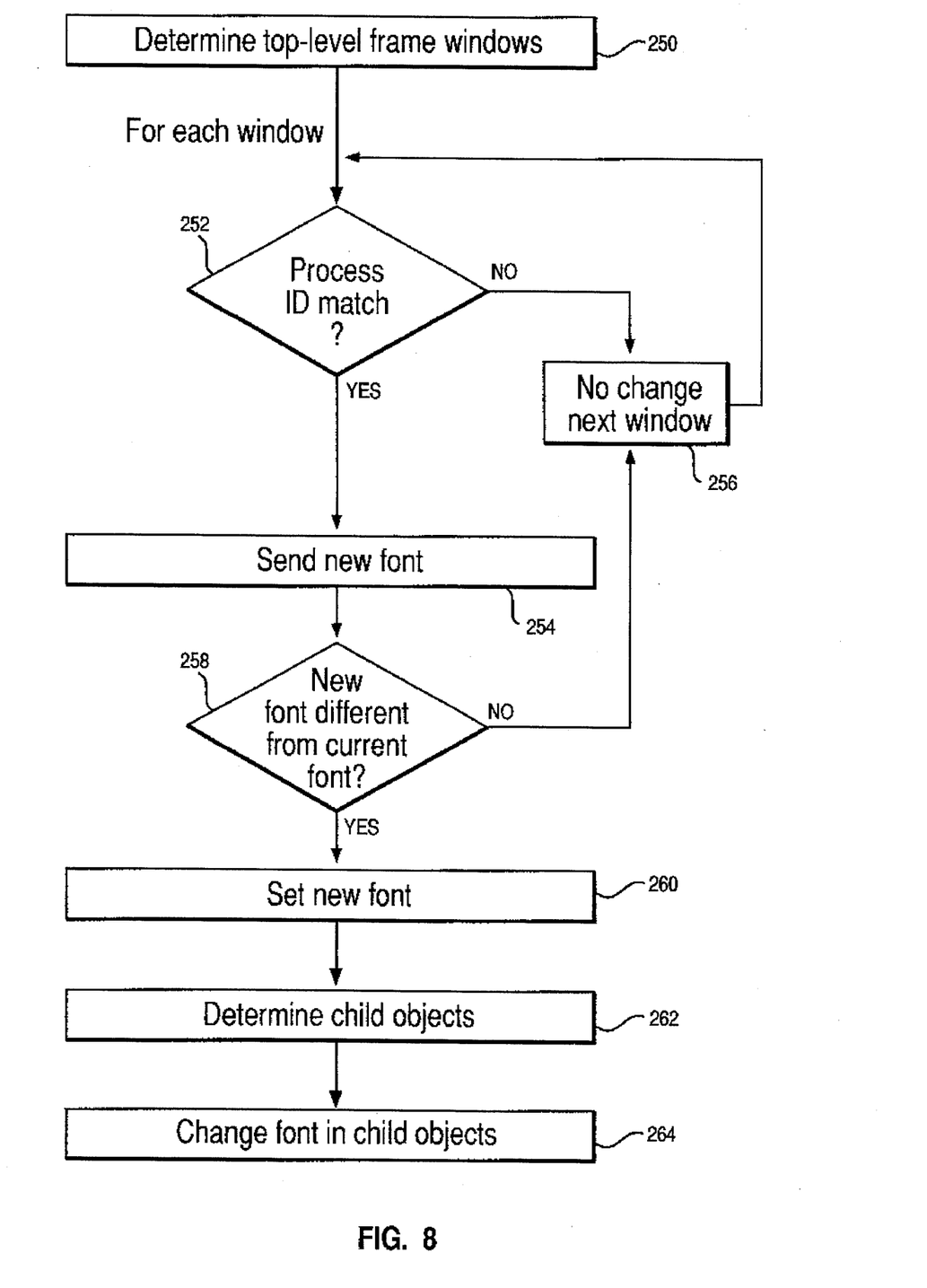
FIG. 8 is a flow diagram of adjusting child objects of other windows in an application.

The invention can also be used to flow a run time font change between all or some of the windows of an application, as shown in FIG. 8. The process begins in step 250. All of the top-level frame windows in the system are determined. Top-level frame windows are those windows that are direct children of the desktop. That is, they are not children of any other window. They can be found by enumerating all direct children of the desktop. Unseen windows of an application are still descendants of the top-level frame or are in the top-level frame s ownership chain, and so the top-level frame can handle their font change. For each top-level frame window found, query and compare its process ID to that of the window which is propagating its font change step 252. If they are the same, they are in the same process, and probably in the same application. Thus, in step 254, the system sends a private message that would only be processed by members of the same application, with a pointer to the new font string as one of its parameters. If the windows do not have the same ID, they are not in the same process, and so should not receive the font, step 256.

If the window receiving this private message has a font different from that to which it is being told to change, step 258, it will issue a WinSetPresParam call to itself, setting itself to use the new font, step 260. If it already has the requested font, no action would be taken, step 256.

Those windows which needed to change to the new font would then handle the font change as if the user had dropped a font on them as described above. First, the related child objects would be determined in step 262 and the font would be changed in those objects in step 264. Part of the private message sent in step 254 should include either the class of the object on which the font was dropped or the class of the parent object used to determine the related objects in the first main window. In step 262, the receiving main window will use this information by consulting its own data structures and tables to determine the related child objects.

While the invention has been described with respect to the particular embodiments above, it would be understood by those skilled in the art that modifications may be made without departing from the spirit and scope of the present invention. These embodiments are for purposes of example and illustration only and are not to be taken to limit the scope of the invention narrower than the scope of the appended claims.

We claim:

1. A method for changing a graphical user interface according to a new font, comprising the steps of:

in response to a first font change command directed to a first object, determining which subset of a set of sibling objects of the first object are specified to be changed;

adjusting size and position of the first and subset of specified sibling objects according to the new font; and presenting the first and subset of specified sibling objects according to their adjusted size and position and the new font.

2. The method as recited in claim 1 which further comprises the steps of:

adjusting each respective set of size and position parameters for each of the subset of specified sibling objects; and presenting the subset of specified sibling objects according to their respective size and position parameters and the new font.

3. The method as recited in claim 2 wherein the size and position parameters are adjusted for the first and subset of specified sibling objects according to an object class of each respective object, and at least one of the subset of specified sibling objects belongs to a different object class than the first object.

4. The method as recited in claim 3 which further comprises the steps of:

determining a set of windows which belong to a first process which owns the first object; and adjusting size and position parameters for objects which correspond to the object classes of the first and set of specified sibling objects within each of the set of windows.

5. The system as recited in claim 4 which further comprises:

a memory coupled to a system bus for storing sets of instructions;

a processor coupled to the system bus for executing the sets of instructions; and a display coupled to the system bus for displaying the graphical user interface.

6. The method as recited in claim 2 wherein the determining step is accomplished by referring to a table in which the specified sibling objects are listed.

7. A system for changing a graphical user interface according to a new font, the graphical user interface including a hierarchy of graphical objects, the system comprising:

means, responsive to first font change command directed to a first object, for determining which of a set of objects nonlinearly related to the first object are specified to be changed in response to a font change command directed to the first object;

means for adjusting size and position of the first and specified objects according to the new font;

means for presenting the first and specified objects according to their adjusted size and position and the new font.

8. The system as recited in claim 7 which further comprises:

means for adjusting each respective set of size and position parameters for the specified objects; and means for presenting the specified objects according to their respective size and position parameters and the new font.

9. The system as recited in claim 8 wherein the size and position parameters are adjusted for the first and specified objects according to an object class of each respective object and at least one of the specified objects belongs to a different object class than the first object.

10. The system as recited in claim 9 which further comprises:

means for determining a set of windows which belong to a first process which owns the first object; and means for adjusting size and position parameters for objects which correspond to the object classes of the first and specified objects within each of the set of windows.

11. The system as recited in claim 8 wherein the determining means refers to a table in which the specified objects are listed.

12. A computer program product residing on a computer readable medium for use in a data processing system for changing a graphical user interface according to a new font comprising:

means for determining which of a set of objects collaterally related to the first object are specified to be changed in response to a font change command directed to the first object;

means for adjusting size and position of the first and specified objects according to the new font; and means for presenting the first and specified objects according to their adjusted size and position and the new font the means activated when the computer readable medium is coupled to and accessed by the data processing system.

13. The product as recited in claim 12 which further comprises:

means for adjusting each respective set of size and position parameters for the specified objects; and means for presenting the specified objects according to their respective size and position parameters and the new font.

14. The product as recited in claim 13 wherein the size and position parameters are adjusted for the first and specified objects according to an object class of each respective object and at least one of the specified objects belongs to a different object class than the first object.

15. The product as recited in claim 14 which further comprises:

means for determining a set of windows which belong to a first process which owns the first object; and means for adjusting size and position parameters for objects which correspond to the object classes of the first and specified objects within each of the set of windows.

16. A method for changing a graphical user interface including a hierarchy of graphical objects comprising the steps of:

storing size and position data of objects in a graphical user interface panel;

establishing a set of selected objects as related independent of the hierarchy, the set of selected objects a subset of all the objects in the graphical user interface panel;

responsive to a font change command to a first object, changing size and position data of the first object and the set of selected objects; and presenting the first and the set of selected objects according to their adjusted size and position data and a new font.

17. A system for changing a graphical user interface, the graphical user interface arranged in a hierarchy of graphical objects, comprising:

means for selecting ones of a set of graphical objects in a window as related objects which are related to each other independent of the hierarchy;

means for detecting a font change command directed to one of the related objects;

means for changing size and position parameters for the related objects according to the font change command; and means for displaying the related objects in the windows according the changed size and position parameters and a new font.

* * * * *